(12) United States Patent
Leske

(10) Patent No.: US 9,576,607 B2
(45) Date of Patent: Feb. 21, 2017

(54) TECHNIQUES FOR CREATING A COMPOSITE IMAGE

(71) Applicant: Google Inc., Mountain View, CA (US)

(72) Inventor: Matthew John Leske, Stockholm (SE)

(73) Assignee: Google Inc., Mountain View, CA (US)

( * ) Notice: Subject to any disclaimer, the term of this patent is extended or adjusted under 35 U.S.C. 154(b) by 21 days.

(21) Appl. No.: 14/601,601

(22) Filed: Jan. 21, 2015

(65) Prior Publication Data

US 2016/0210998 A1 Jul. 21, 2016

(51) Int. Cl.
| | | |
|---|---|---|
| H04N 7/15 | (2006.01) | |
| G11B 27/031 | (2006.01) | |
| G06T 11/60 | (2006.01) | |
| H04N 7/14 | (2006.01) | |

(52) U.S. Cl.
CPC ............. *G11B 27/031* (2013.01); *G06T 11/60* (2013.01); *H04N 7/147* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 5,623,587 A | 4/1997 | Bulman | |
| 7,542,042 B1 | 6/2009 | Allen et al. | |
| 7,576,755 B2 | 8/2009 | Sun et al. | |
| 8,284,999 B2 | 10/2012 | Kurzweil et al. | |
| 2003/0218626 A1 | 11/2003 | Greene | |
| 2009/0033737 A1 | 2/2009 | Goose et al. | |
| 2009/0115905 A1* | 5/2009 | Estrop | G06T 5/20 348/598 |
| 2009/0257730 A1 | 10/2009 | Chen et al. | |
| 2013/0120453 A1 | 5/2013 | Carmi | |
| 2014/0274368 A1* | 9/2014 | Cotter | A63F 13/355 463/31 |
| 2014/0320586 A1 | 10/2014 | Tan et al. | |
| 2015/0062283 A1* | 3/2015 | Mintz | H04N 7/147 348/14.07 |
| 2015/0264272 A1* | 9/2015 | Burns | G11B 27/10 386/201 |

OTHER PUBLICATIONS

Boyer, D. et al., "The Personal Presence System—A Wide Area Network Resource for the Real Time Composition of Multipoint Multimedia Communications," ACM Multimedia, Proceedings of the International Conference, New York, NY, Oct. 15, 1994, pp. 453-460.

PCT International Search Report and Written Opinion dated Apr. 21, 2016 for PCT International Application No. PCT/US2016/013996, 14 pages.

* cited by examiner

*Primary Examiner* — Eileen Adams
(74) *Attorney, Agent, or Firm* — Remarck Law Group PLC

(57) ABSTRACT

A computer-implemented technique can include receiving, at a server computing device having one or more processors, a first video stream from a first user computing device associated with a first user. The first video stream can include a first image portion. The technique can further include extracting the first image portion of the first video stream in order to generate a first overlay stream, and receiving a second video stream from a second user computing device associated with a second user. A composite video stream can be generated from the first overlay stream and the second video stream. The composite video stream can comprise the first overlay stream superimposed over the second video stream. The composite video stream can be output to the second user computing device.

20 Claims, 8 Drawing Sheets

TECHNIQUES FOR CREATING A COMPOSITE IMAGE

FIELD

The present disclosure relates to computer-implemented imaging techniques and, more particularly, to a technique for creating a composite image and/or video from two separate video streams.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

It is very popular these days to take pictures. People take pictures of themselves ("selfies"), of landmarks, of their friends, and even of their food. Sometimes, a person will use photo-editing software to edit the captured images. Photo-editing software can be used, e.g., to enhance an image (edit the contrast, brightness, etc.), crop an image, and/or edit an image to include representations of items not in the original image. For example, a user may utilize photo-editing software to add a representation of a famous person from a separate image to an original image of themselves in order to create a composite image that makes it appear as if both the user and the famous person were together in an original picture. Such photo-editing software can, however, be cumbersome and time-consuming to use.

SUMMARY

In some implementations, a computer-implemented technique for creating a composite image is disclosed. The technique includes receiving, at a server computing device having one or more processors, a first video stream from a first user computing device associated with a first user via a network. The first video stream can include a first image portion that is representative of at least a portion of the first user. The technique can also include extracting, at the server computing device, the first image portion of the first video stream in order to generate a first overlay stream. Further, the technique can include receiving, at the server computing device, a second video stream from a second user computing device associated with a second user via the network. The second video stream can include a second image portion that is representative of at least a portion of the second user. Also, the technique can further include extracting, at the server computing device, the second image portion of the second video stream in order to generate a second overlay stream.

The technique can additionally include receiving, at the server computing device, a background video stream representative of a background scene, and generating, at the server computing device, a composite video stream from the first overlay stream, the second overlay stream, and the background video stream. The composite video stream can comprise the first and second overlay streams superimposed over the background video stream such that the composite video stream includes the portion of the first user and the portion of the second user superimposed over the background scene.

The technique can also include outputting, at the server computing device, the composite video stream to the first and second user computing devices via the network. A command can be received, at the server computing device and from the first user computing device, to capture a static image from the composite video stream. In response, the static image can be generated at the server computing device. The static image can comprise the portion of the first user and the portion of the second user superimposed over the background scene. The static image can be output, at the server computing device, to the first user computing device.

In some implementations, a computer-implemented technique for creating a composite image is disclosed. The technique can include receiving, at a server computing device having one or more processors, a first video stream from a first user computing device associated with a first user. The first video stream can include a first image portion. The technique can further include extracting, at the server computing device, the first image portion of the first video stream in order to generate a first overlay stream, and receiving, at the server computing device, a second video stream from a second user computing device associated with a second user. A composite video stream can be generated, at the server computing device, from the first overlay stream and the second video stream. The composite video stream can comprise the first overlay stream superimposed over the second video stream. The composite video stream can be output, from the server computing device, to the second user computing device.

In some implementations, the technique can further include receiving, at the server computing device, a command from the second user computing device to capture a static image from the composite video stream, and generating, at the server computing device, the static image in response to receiving the command. The technique can also include comprising outputting, at the server computing device, the static image to at least one of the first and second user computing devices.

In some implementations, the technique can further include receiving, at the server computing device, a background video stream representative of a background scene. In these embodiments, the composite video stream can comprise the first overlay stream and at least a portion of the second video stream superimposed over the background scene. The technique can also include extracting, at the server computing device, the portion of the second video stream from the second video stream. The portion of the second video stream can be representative of at least a portion of the second user. In various embodiments, the first image portion can be representative of at least a portion of the first user.

Additionally or alternatively, the server computing device can receive the first video stream and the second video stream concurrently. In these examples, the composite video stream can be generated such that the first overlay stream and the second video stream in each frame of the composite video stream originate from a same time. Further, the server computing device can generate the composite video stream automatically upon receipt of the first and second video streams.

Furthermore, the server computing device can receive the first and second video streams via the Internet. Additionally or alternatively, the server computing device can output the composite video stream via the Internet.

The first video stream, in some embodiments, can comprise a plurality of frames. Each frame of the plurality of frames can include one or more portions associated with a foreground and one or more portions associated with a background. In these examples, the first image portion can include the one or more portions associated with the foreground.

In further embodiments, a server computing device is disclosed. The computing device can include one or more processors and a non-transitory, computer readable medium storing instructions that, when executed by the one or more processors, cause the computing device to perform operations. The operations can include any one or more of the techniques described above.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
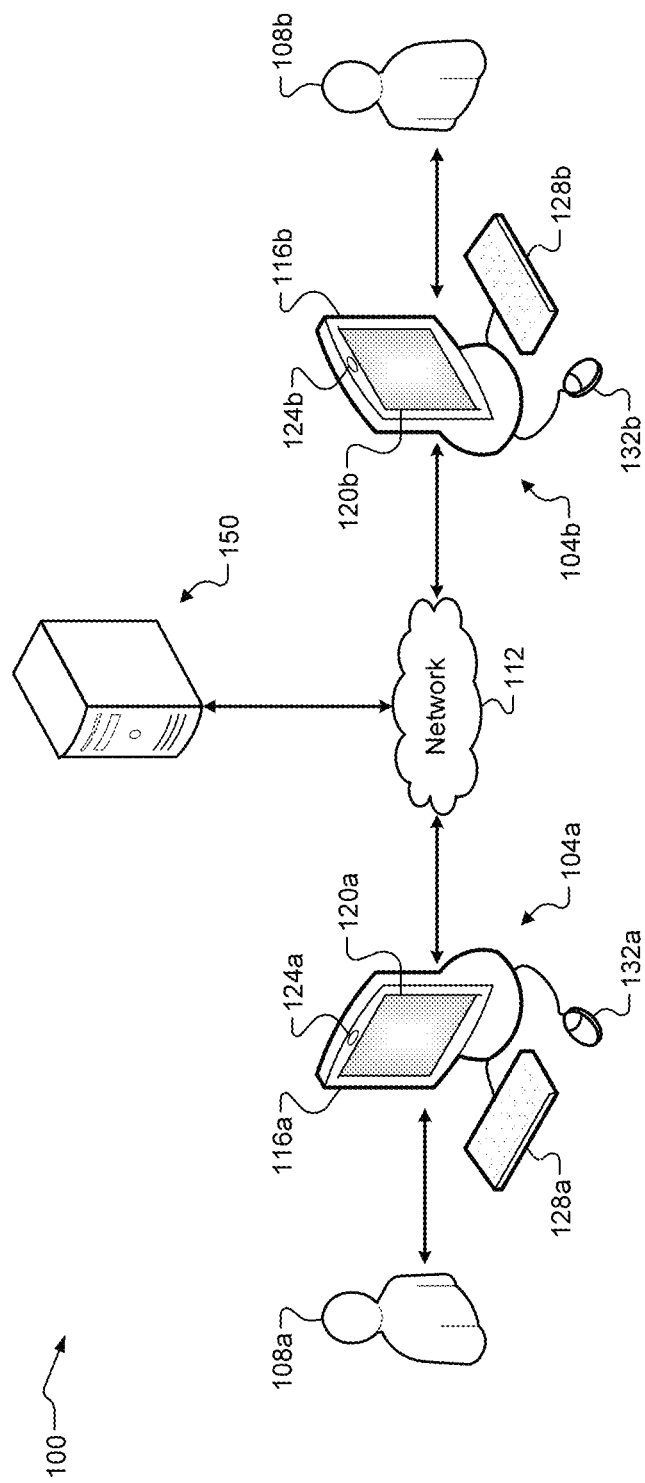
FIG. 1 is a diagram of a computing system including an example server computing device and user computing devices according to some implementations of the present disclosure.

As briefly mentioned above, current techniques for creating composite images involve the use of photo-editing software to combine portions of two previously captured images. In this manner, a user can, e.g., add a representation of a person in a first image to a second image. For example, a first image of a person can be combined with a second image of a landmark to create a composite image that makes it appear as if the person was at the landmark. In another example, a first image of a first person can be combined with a second image of a second person to create a composite image that makes it appear as if the first and second persons were together for a picture.

While current techniques can be utilized to create such composite images, these techniques can be difficult and/or time-consuming to use. For example, if two friends that are physically distant from each other want to create a picture of themselves together, each friend must take a picture of him- or herself, provide the pictures to one or both of them, and then post-process the images to create a composite image via photo-editing software. Additionally, because such techniques utilize previously captured images, the subjects of the images are unable to interact in an intuitive way. For example, two people may want to pose with each other, or with another item or background in the composite image. The current techniques make this difficult as the individuals cannot see the other person/item/background in the other image.

The present disclosure provides for an improved technique for creating composite images. In some embodiments, the present disclosure describes a server computing device that receives first and second video streams from first and second user computing devices, respectively. The server computing device generates a composite video stream from the first and second video streams. The server computing device can also extract a first image portion of the first video stream in order to generate a first overlay stream. The first image portion can include a representation of a first user associated with the first computing device. For example only, the first image portion can be the portion of the first video stream that displays the first user separate from all other portions of the first video stream. In this manner, the first overlay stream can comprise an image of the first user distinct from all other parts (e.g., the background) of the first video stream.

Based on the first overlay stream and the second video stream, the server computing device can generate a composite video stream that includes the first overlay stream superimposed over the second video stream. The composite video stream can be output to one or both of the first and second user computing devices, where the composite video stream can be displayed. The server computing device can receive a command from the first or second user computing device to capture a static image from the composite video stream. In response to receiving the command, the server computing device can generate the static image, which can then be output to the first and/or second user computing devices. Further details of various implementations are described below.

Referring now to FIG. 1, a diagram of an example computing system 100 is illustrated. The computing system 100 can include user computing devices 104*a* and 104*b* (referred to herein individually and collectively as "user computing device(s) 104") that are operated by users 108*a* and 108*b* (referred to herein individually and collectively as "user(s) 108"), respectively. The user computing devices 104 can be configured to communicate with each other via a network 112. Examples of the user computing devices 104 include desktop computers, laptop computers, tablet computers, and mobile phones. While two computing devices 104 are illustrated, it should be appreciated that the computing system 100 can include any number of computing devices 104 that can communicate with each other for a group chat session. The network 112 can include a local area network (LAN), a wide area network (WAN), e.g., the Internet, or a combination thereof.

In some implementations, the user computing devices 104 include peripheral components. The computing devices 104 include displays 116*a* and 116*b* (referred to herein individually and collectively as "display(s) 116") having display areas 120*a* and 120*b* (referred to herein individually and collectively as "display area(s) 120"), respectively. In some implementations, the displays 116 are touch displays. The computing devices 104 also include video cameras 124*a* and 124*b* (collectively "video cameras 124"). The video cameras 124 can each be configured to capture image and video data with respect to its respective computing device 104. For example, the video cameras 124 can be configured to capture image and video data of the users 108. The computing devices 104 can also include other input devices, such as mice 132*a* and 132*b* (referred to herein individually and collectively as "mouse/mice 132") and keyboards 128*a* and 128*b* (referred to herein individually and collectively as "keyboard(s) 128").

The computing system 100 can further include a server computing device 150 that is configured to communicate with the user computing devices 104 via the network 112. As used herein, the term "server computing device" can refer to any suitable hardware computer server, as well as both a single server and multiple servers operating in a parallel or distributed architecture.

Figure 2:
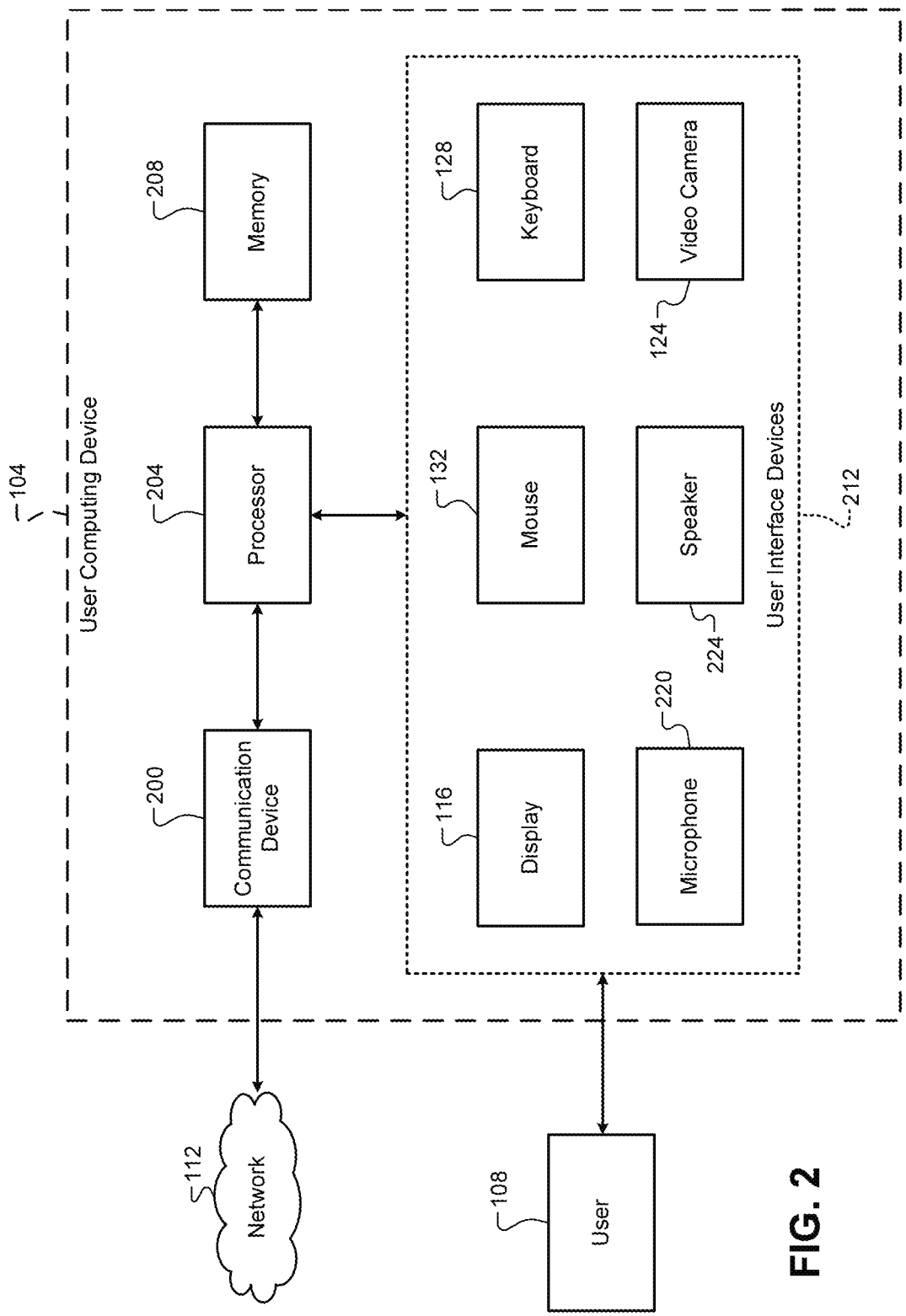
FIG. 2 is a functional block diagram of the example user computing device of FIG. 1.

Referring now to FIG. 2, a functional block diagram of one example computing device 104 is illustrated. While a single computing device 104 and its associated user 108 and example components are described and referred to hereinafter, it should be appreciated that both computing devices 104 can have the same or similar configuration and thus can operate in the same or similar manner. The computing device 104 can include a communication device 200, a processor 204, and a memory 208. The computing device 104 can also include the display 116, the mouse 132, the keyboard 128, and the video camera 124 (referred to herein individually and collectively as "user interface device(s) 212"). The user interface devices 212 are configured for interaction with the user 108. In some implementations, the user interface devices 212 can further include a microphone 220, and a speaker 224.

The communication device 200 is configured for communication between the processor 204 and other devices, e.g., the other computing device 104 and the server computing device 150, via the network 112. The communication device 200 can include any suitable communication components, such as a transceiver. Specifically, the communication device 200 can transmit a request to initiate a chat communication session and can provide a response to this request to the processor 204. The communication device 200 can then handle transmission and receipt of the various communications between the computing devices 200 during the chat session. The memory 208 can be configured to store information at the computing device 104, such as chat settings for the user 108. The memory 208 can be any suitable storage medium (flash, hard disk, etc.).

The processor 204 can be configured to control operation of the computing device 104. It should be appreciated that the term "processor" as used herein can refer to both a single processor and two or more processors operating in a parallel or distributed architecture. The processor 204 can be configured to perform general functions including, but not limited to, loading/executing an operating system of the computing device 104, controlling communication via the communication device 200, and controlling read/write operations at the memory 208. The processor 204 can also be configured to perform specific functions relating to at least a portion of the present disclosure, which are described in greater detail below.

Figure 3:
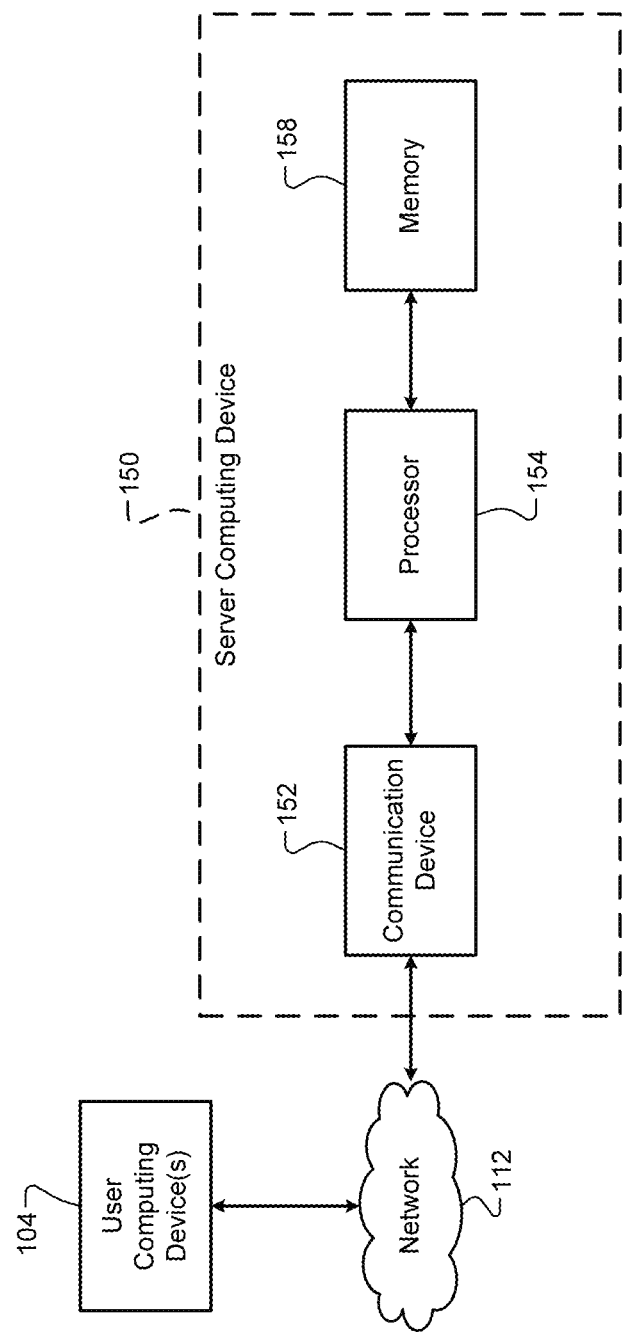
FIG. 3 is a functional block diagram of the example server computing device of FIG. 1.

Referring now to FIG. 3, a functional block diagram of the server computing device 150 is illustrated. It should be appreciated that the server computing device 150 can have the same or similar structure to the user computing devices 104 described above. The server computing device 150 can include a communication device 152, a processor 154, and a memory 158. As described above, the term "processor" as used herein can refer to both a single processor and multiple processors operating in a parallel or distributed architecture. The communication device 152 can include any suitable communication components (e.g., a transceiver) for communication via the network 112. The memory 158 can be any suitable storage medium (flash, hard disk, etc.) for storing information at the server computing device 150. The processor 154 can control operation of the server computing device 150 and can implement at least a portion of the techniques of the present disclosure, which are described in greater detail below.

As briefly mentioned above, the present disclosure relates to techniques for creating a composite video stream and/or a composite image from two distinct video streams. While these techniques will be described in relation to the user computing devices 104 and the server computing device 150, it should be appreciated that more or less computing devices can be used to perform these techniques. Furthermore, it should also be appreciated that, while each feature or element of these techniques may be described as being performed by a specific computing device, such features or elements could instead be performed by another computing device or computing devices, alone or in combination with the specific computing device described.

Figure 4:
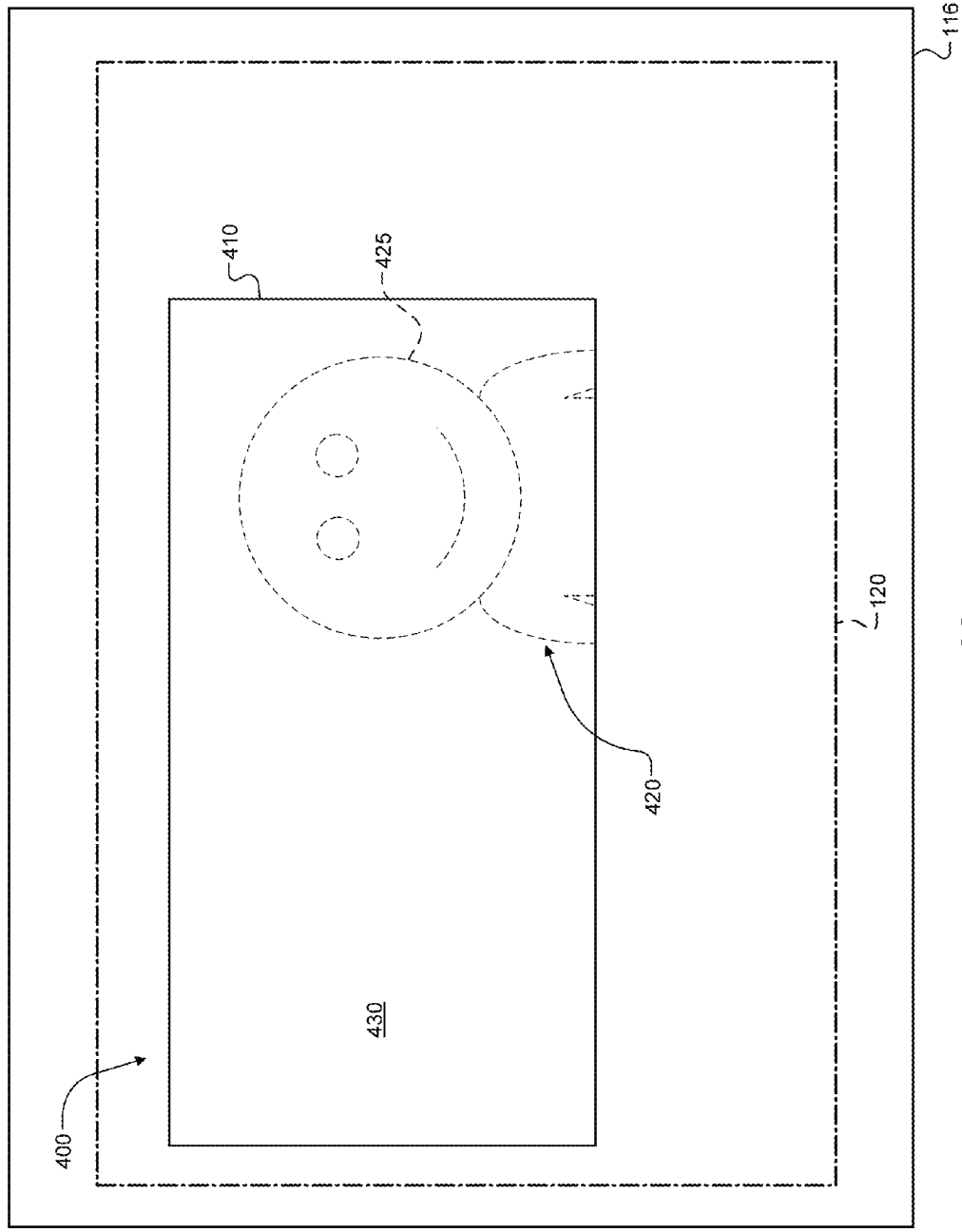
FIG. 4 is a view of a display of the example user computing device of FIG. 1. displaying a first video stream according to some implementations of the present disclosure.

Referring now to FIG. 4, a diagram of the display 116 of an example user computing device 104 is illustrated. The user computing device 104 can load and execute a video chat application 400, which is illustrated as a window with respect to the display area 120 of the display 116. While a video chat application 400 is specifically discussed, it should be appreciated that the functionality of the video chat application described herein could be initiated or executed by an operating system or another application, such as a web browser. The video chat application 400 may not occupy the entire display area 120, e.g., due to toolbars or other borders (not shown). The video chat application 400 can be configured to display a first video stream 410, e.g., captured from the video camera 124 associated with the user computing device 104. As illustrated, the video chat application 400 occupies a portion of the display area 120. It should be appreciated, however, that the video chat application 400 could occupy the entire display area 120.

The first video stream 410 can include a plurality of image portions, such as a first image portion 420 and a second image portion 430 as shown. An image portion can comprise any portion or part of a video stream. For example only, a video stream (such as the first video stream 410) can include a plurality of frames or images that are displayed in a sequence. Each frame can be thought of as a still image, and different portions of each frame can be associated with image portions of the video stream. In some video streams, there may be one or more portions of each frame that are associated with a foreground and one or more portions that are associated with a background.

In the illustrated example of FIG. 4, for example, the first image portion 420 is associated with a foreground—that is, a representation of a person 425, e.g., a first user 108. Further, the second image portion 430 is associated with a background—that is, the background scene behind the representation of the person 425, which happens to be the remainder of the first video stream 410. In some embodiments, the first image portion 420 is representative of at least a portion of a first user 108.

Figure 5:
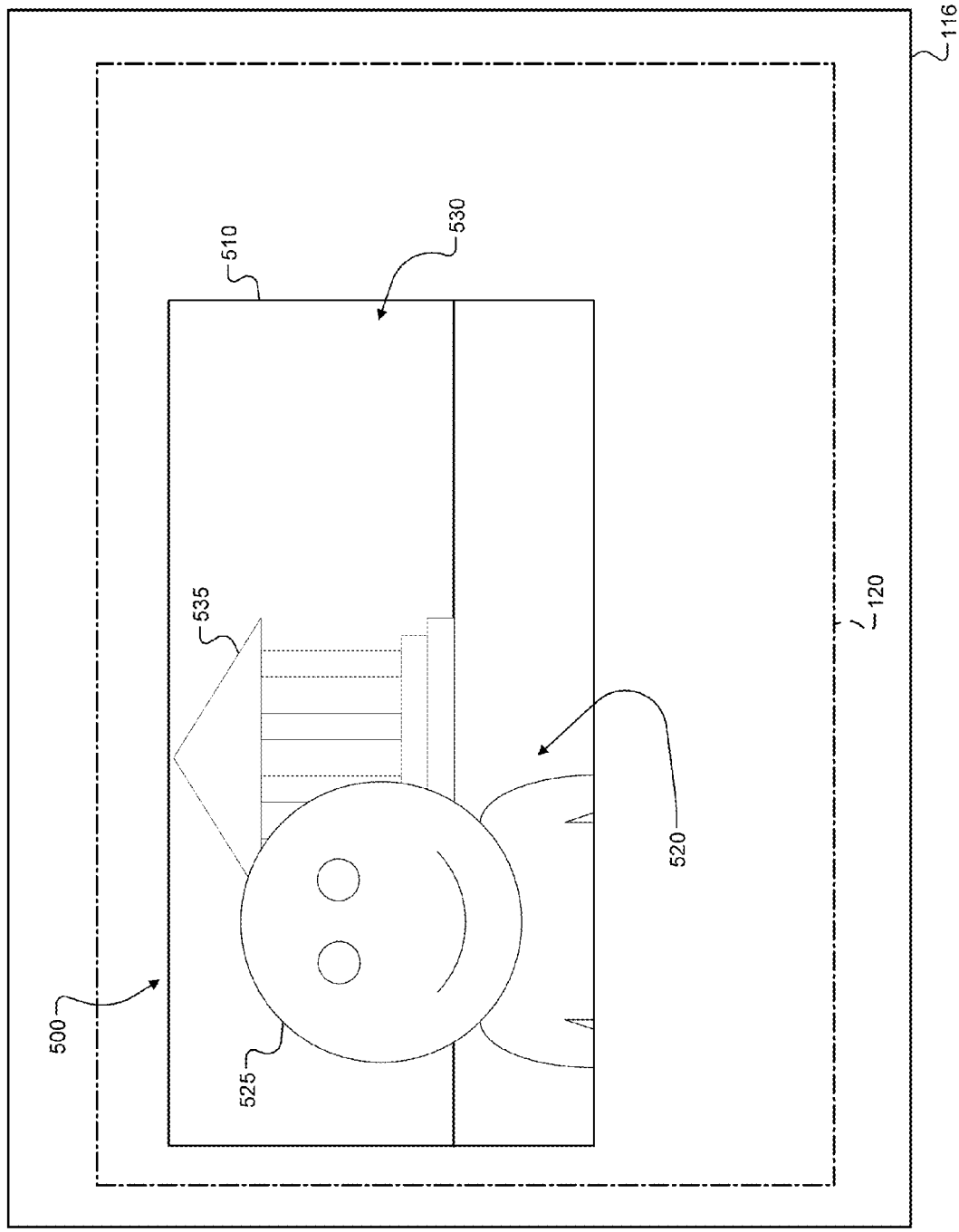
FIG. 5 is a view of a display of the example user computing device of FIG. 1. displaying a second video stream according to some implementations of the present disclosure.

Referring now to FIG. 5, another diagram of the display 116 of an example user computing device 104 is illustrated. The user computing device 104 can load and execute a video chat application 500, which is illustrated as a window with respect to the display area 120 of the display 116. While a video chat application 500 is specifically discussed, it should be appreciated that the functionality of the video chat application described herein could be initiated or executed by an operating system or another application, such as a web browser. The video chat application 500 may not occupy the entire display area 120, e.g., due to toolbars or other borders (not shown). The video chat application 500 can be configured to display a second video stream 510, e.g., captured from the video camera 124 associated with the user computing device 104. As illustrated, the video chat application 500 occupies a portion of the display area 120. It should be appreciated, however, that the video chat application 500 could occupy the entire display area 120.

The first video stream 510 can include a plurality of image portions, such as a first image portion 520 and a second image portion 530 as shown. As mentioned above, an image portion can comprise any portion or part of a video stream. In the illustrated example of FIG. 5, for example, the first image portion 520 is associated with a foreground (that is, a representation of a person 525, e.g., a second user 108) and the second image portion 530 is associated with a background (that is, the background scene behind the representation of the person 525, which happens to be the remainder of the first video stream 510). The second image portion 530 can also include representations of items, such as a building 535 shown in FIG. 5. In some embodiments, the first image portion 520 is representative of at least a portion of a second user 108.

It should be appreciated that FIGS. 4 and 5 are merely descriptive, represent only one illustrative example, and are not intended to describe the composition of all possible video streams. Each of the first and second video streams 410, 510 can, e.g., include more than a first image portion and a second image portion. For example only, the first and second video streams 410, 510 can include numerous portions that are contiguous or separate from other portions. Additionally, the labels "first" image portion and "second" image portion are not intended to be limited to individual pixels or other measurable units of the video streams 410, 510. An image portion as used herein is merely meant to distinguish between a part of the image from another part of the image and/or the entire image.

In some embodiments, the server computing device 150 can receive the first video stream 410 and the second video stream 510, e.g., from the first and the second user computing devices 104a, 104b, respectively. The server computing device 150 can extract one or more image portions (such as, first image portions 420, 520 and/or second image portions 430, 530) from the first and/or second video streams 410, 510. The server computing device 150 can utilize the extracted image portions to generate one or more overlay streams, which can be used to generate a composite video stream as described more fully below.

The server computing device 150 can extract image portions from the first or second video streams 410, 510 in any manner. For example only, the server computing device 150 can utilize object detection/recognition algorithms to detect objects (a person, an item, a face, etc.) in a video signal. Once an object has been identified in the video signal, the server computing device 150 can isolate the portion of the image in each frame of the video signal that is associated with the detected object(s), and extract those portions to create an overlay stream. In some embodiments, a user 108 can select objects in the first or second video streams 410, 510 to isolate as the portion of the stream to include in an overlay stream. In additional or alternative implementations, the server computing device 150 can utilize foreground/background detection algorithms to detect foreground portion(s) and background portion(s) in a video signal. The foreground/background portion(s) can, e.g., be included in an overlay stream, or can be excluded from video stream in order to generate the overlay stream.

Figure 6:
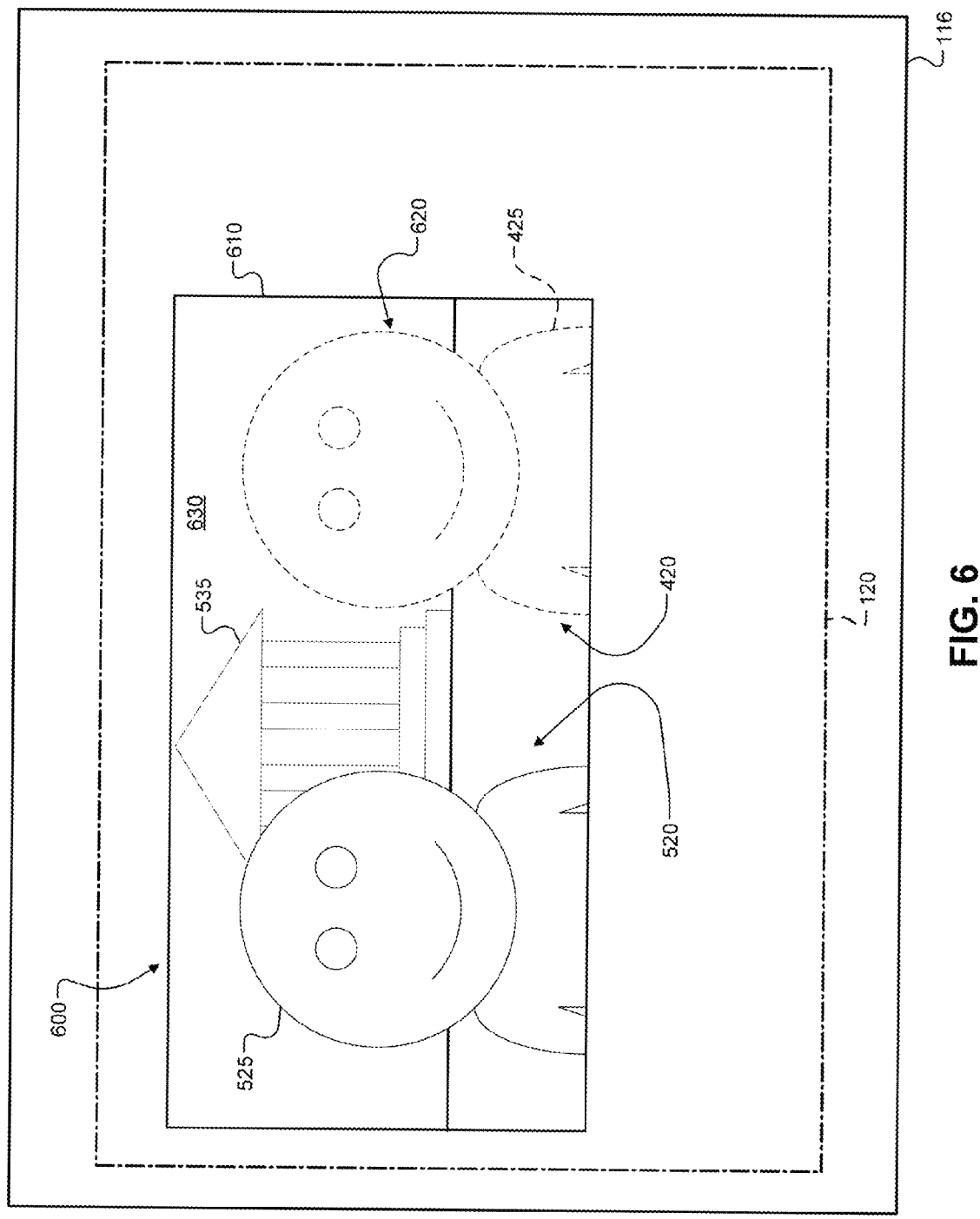
FIG. 6 is a view of a display of the example user computing device of FIG. 1. displaying a composite video stream according to some implementations of the present disclosure.

Referring now to FIG. 6, another diagram of the display 116 of an example user computing device 104 is illustrated. The user computing device 104 can load and execute a video chat application 600, which is illustrated as a window with respect to the display area 120 of the display 116. While a video chat application 600 is specifically discussed, it should be appreciated that the functionality of the video chat application described herein could be initiated or executed by an operating system or another application, such as a web browser. The video chat application 600 may not occupy the entire display area 120, e.g., due to toolbars or other borders (not shown). The video chat application 600 can be configured to display a composite video stream 610, e.g., that has been generated based on the first and second video streams 410, 510 and output from the server computing device 150.

In some implementations, the composite video stream 610 comprises an overlay stream over one of the first and second video streams. For example only, in the illustrated example of FIG. 6, the composite video stream 610 comprises a first overlay stream 620 superimposed over the second video stream 510. The first overlay stream 620 comprises the first image portion 420 isolated from the remainder (e.g., the second image portion 430) of the first video signal 410. In the resulting composite video stream 610, the first image portion 420 appears as if it is present in the second video stream 520. Specifically, in the composite video stream 610, the representation of the person 425 appears over a portion of the second image portion 530 and adjacent to the representation of items, such as the representation of the person 525 and the building 535.

Implementations other than the illustrated example can also be utilized. In some embodiments, in addition to the first image portion 420 being extracted from the first video signal 410, a second image portion (such as image portion 520) can be extracted from the second video signal 510 in order to generate a second overlay stream. The server computing device 150 can also receive a background video stream 630 as shown in FIG. 6. The server computing device 150 can generate the composite video stream 610 from the first overlay stream 620, the second overlay stream (represented as image portion 520 in FIG. 6), and the background video stream 630. In these embodiments, the composite video stream 610 comprises the first and second overlay streams superimposed over the background video stream 630. In some implementations, the composite video stream 610 includes a portion of the first user 104 (e.g., the representation of the person 425) and a portion of the second user 104 (e.g., the representation of the person 525) superimposed over the background scene (e.g., the representation of the building 535).

The server computing device 150 can receive the background video stream 630 in any manner. For example only, the server computing device 150 can receive the background video stream 630 from one of the user computing devices 104 or another computing device via the network 112. In other examples, the server computing device 150 can receive the background video stream 630 from its memory 158 or other non-transitory electronic storage medium (not shown) with which the server computing device 150 can communicate (a database, a storage system, etc.). In some embodiments, the server computing device 150 can store (e.g., in the memory 158) a plurality of background video streams 630 that users 104 can select to include in the composite video stream 630. In this manner, a user 104 can select an interesting background scene (the surface of the moon, the Great Wall of China, etc.) over which an overlay video stream(s) can be superimposed. It should be appreciated that the background video stream 630 can be a dynamic video signal that includes movement, changes, etc. in the background scene, a static image repeated to create a video signal that includes a non-moving background, or a combination of the two.

The server computing device 150 can output the composite video stream 610 to one or more user computing devices 104. The user computing device(s) 104 can display the composite video stream 610, e.g., on an associated display 116, and an associated user 108 can interact with the user computing device 104 and the video chat application 400, 500, 600. In some embodiments, the user 104 can provide an input to the user computing device 104 to capture a static image from the composite video stream 610. For example only, the user computing device 104 can transmit a command to the server computing device 150 to capture the static image from the composite video stream 610. In response, the server computing device 150 can generate the static image, and output the static image to one or more of the user computing devices 104. The static image can comprise a static, unchanging image that is representative of the composite video stream 610 at a particular time.

In some embodiments, the server computing device 150 can receive the first video stream 410 and the second video stream 510 concurrently. In this manner, the composite video stream 610 can be generated such that, in each frame of the composite video stream 610, the portions of the first and second video streams 410, 510 included in the composite video stream 610 originate from the same time. For example only, the server computing device 150 can automatically generate the composite video stream upon receipt of the first and second video streams 410, 510 (and, in some cases, a background video stream 630). It should be appreciated that reference to a "same" time is intended to include times that are not at the same exact time, but times that are similar but differ slightly, e.g., due to processing, network, and transmission delays.

For example only, the server computing device 150 can receive a first video stream 410 from a first user computing device (e.g., user computing device 104a) and a second video stream 510 from a second user computing device (e.g., user computing device 104b). The server computing device 150 can receive the first and second video streams 410, 510, e.g., from the Internet, which is represented as network 112 in FIG. 1. In response, the server computing device 150 can generate the composite video stream 610 in any of the manners described above, and output the composite video stream to one or both of the first and second user computing devices 104a, 104b, e.g., via the Internet (network 112). In this manner, users 108 are able to easily and automatically create composite video streams 610 (and/or static images representative of a composite video stream 610) by interacting with their associated user computing devices 104, and without any active image processing/editing activities.

Figure 7:
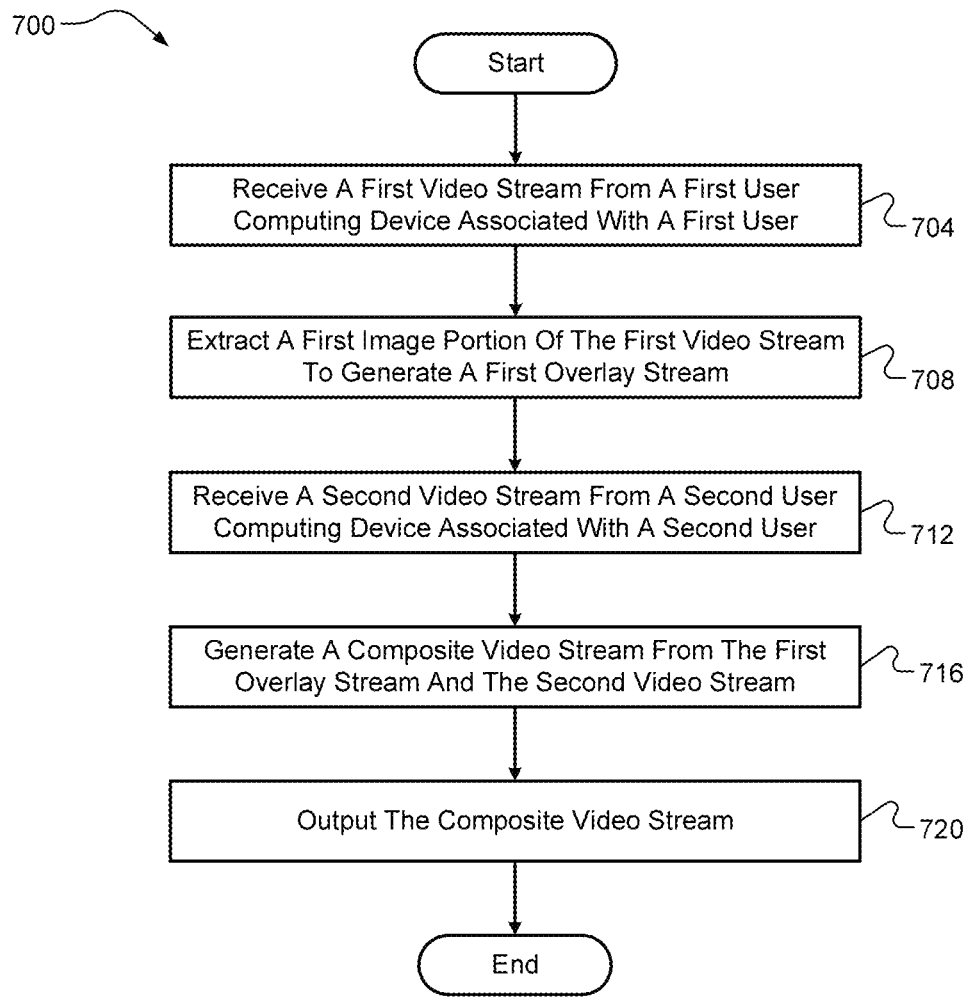
FIG. 7 is a flow diagram of an example technique for creating a composite image according to some implementations of the present disclosure.

Referring now to FIG. 7, a flow diagram of an example technique 700 for creating a composite image (such as, a composite video stream 610) is illustrated. For ease of description, the technique 700 will be described in reference to being performed by the server computing device 150, but it should be appreciated that the technique 700 can also or alternatively be performed by a user computing device 104, two or more user computing devices 104 operating in a parallel or distributed architecture, and/or any one or more particular components of the server computing device 150 and/or one or a plurality of user computing devices 104.

At 704, the server computing device 150 can receive a first video stream (such as first video stream 410) from a first user computing device (such as user computing device 104a) associated with a first user (such as user 108a). As mentioned above, the first video stream can include a first image portion, such as first image portion 420. At 708, the server computing device 150 can extract the first image portion of the first video stream in order to generate a first overlay stream. At 712, the server computing device 150 can receive a second video stream (such as second video stream 510) from a second user computing device (such as user computing device 104b) associated with a second user (such as user 108b).

The server computing device 150 can generate a composite video stream (such as composite video stream 610) from the first overlay stream and the second video stream at 716. As mentioned above, the composite video stream can comprise the first overlay stream superimposed over the second video stream. At 720, the server computing device 150 can output the composite video stream, e.g., to the first and/or second user computing devices 104. The technique 700 can then end or return to 704 for one or more additional cycles.

Figure 8:
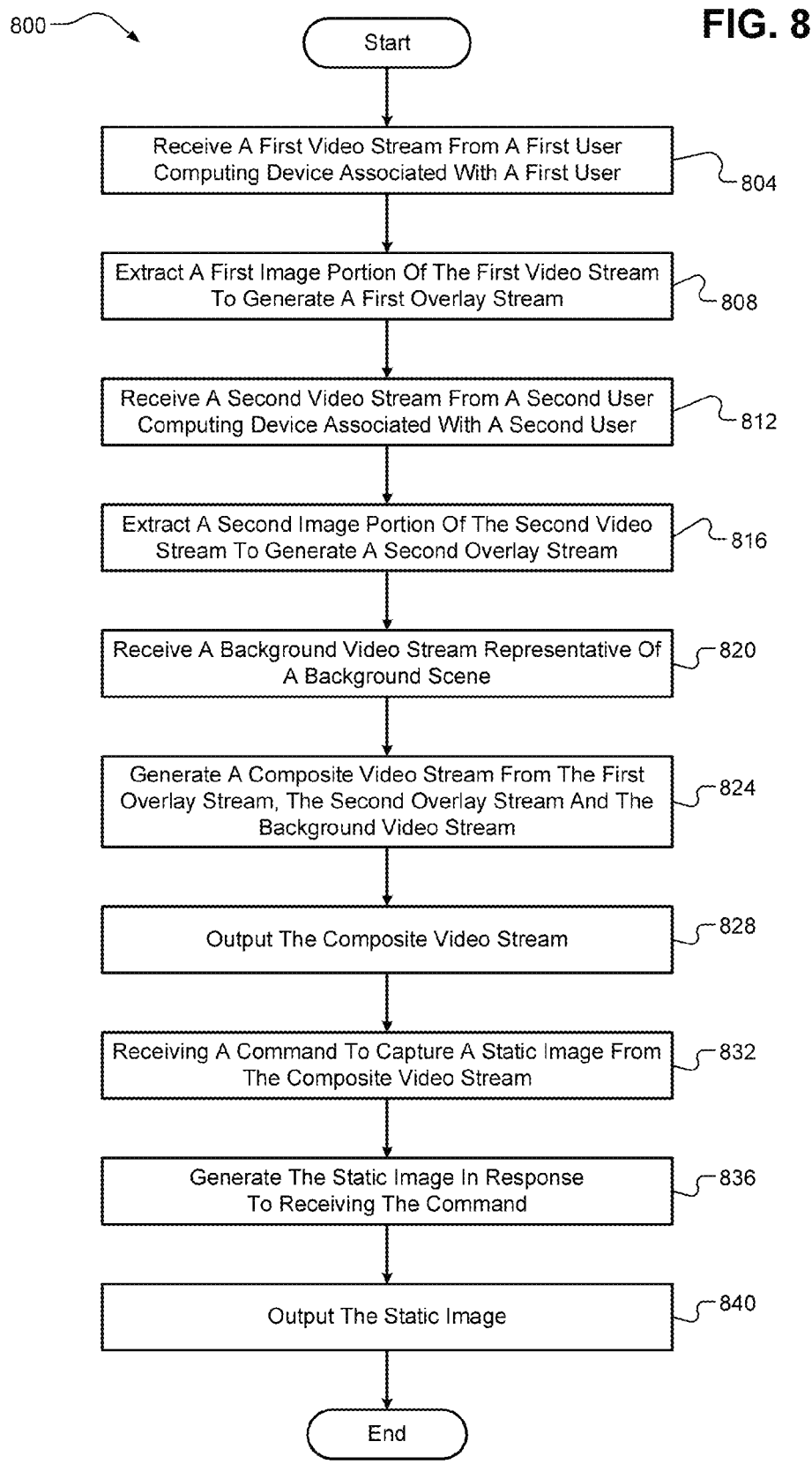
FIG. 8 is a flow diagram of another example technique for creating a composite image according to some implementations of the present disclosure.

Referring now to FIG. 8, a flow diagram of another example technique 800 for creating a composite image (such as, a composite video stream 610) is illustrated. For ease of description, the technique 800 will be described in reference to being performed by the server computing device 150, but it should be appreciated that the technique 800 can also or alternatively be performed by a user computing device 104, two or more user computing devices 104 operating in a parallel or distributed architecture, and/or any one or more particular components of the server computing device 150 and/or one or a plurality of user computing devices 104.

At 804, the server computing device 150 can receive a first video stream (such as first video stream 410) from a first user computing device (such as user computing device 104a) associated with a first user (such as user 108a). As mentioned above, the first video stream can include a first image portion, such as first image portion 420. Additionally, the first image portion can be representative of at least a portion of the first user (such as a representation of a person 425). At 808, the server computing device 150 can extract the first image portion of the first video stream in order to generate a first overlay stream.

At 812, the server computing device 150 can receive a second video stream (such as second video stream 510) from a second user computing device (such as user computing device 104b) associated with a second user (such as user 108b). As mentioned above, the second video stream can include a second image portion, such as first image portion 520. Additionally, the second image portion can be representative of at least a portion of the second user (such as a representation of a person 525). At 816, the server computing device 150 can extract the second image portion of the second video stream in order to generate a second overlay stream.

At 820, the server computing device 150 can receive a background video stream (such as background video stream 630). As mentioned above, the server computing device 150 can receive the background video stream in any manner and from any location, such as from a user computing device 104 or memory 154. The background video stream can be representative of a background scene, such as the representation of the building 535 described above.

The server computing device 150 can generate a composite video stream (such as composite video stream 610) from the first overlay stream, the second overlay stream and the background video stream at 824. As mentioned above, the composite video stream can comprise the first and second overlay streams superimposed over the background video stream. In this manner, the composite video stream can include the portion of the first user and the portion of the second user superimposed over the background scene. At 828, the server computing device 150 can output the composite video stream, e.g., to the first and/or second user computing devices 104. As mentioned above, the server computing device 150 can output the composite video stream via the Internet (represented as network 112).

At 832, the server computing device 150 can receive a command to capture a static image from the composite video stream. The command can be received from one of the user computing devices 104, or from any other computing device. At 836, the server computing device 150 can generate the static image in response to receiving the command. In some embodiments, the static image can comprise the portion of the first user and the portion of the second user superimposed over the background scene. The server computing device 150 can output the static image at 840, e.g., to the first and/or second user computing devices 104 via network 112 (e.g., the Internet). The technique 800 can then end or return to 804 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a server computing device having one or more processors, a first video stream from a first user computing device associated with a first user via a network, the first video stream including a first image portion that is representative of at least a portion of the first user;
extracting, at the server computing device, the first image portion of the first video stream by utilizing an object detection algorithm to detect a first face in the first video stream in order to generate a first overlay stream;
receiving, at the server computing device, a second video stream from a second user computing device associated with a second user via the network, the second video stream including a second image portion that is representative of at least a portion of the second user;
extracting, at the server computing device, the second image portion of the second video stream by utilizing the object detection algorithm to detect a second face in the second video stream in order to generate a second overlay stream;
receiving, at the server computing device, a background video stream representative of a background scene;
generating, at the server computing device, a composite video stream from the first overlay stream, the second overlay stream, and the background video stream, the composite video stream comprising the first and second overlay streams superimposed over the background video stream such that the composite video stream includes the portion of the first user and the portion of the second user superimposed over the background scene;
outputting, at the server computing device, the composite video stream to the first and second user computing devices via the network;
receiving, at the server computing device, a command from the first user computing device to capture a static image from the composite video stream;
generating, at the server computing device, the static image in response to receiving the command, the static image comprising the portion of the first user and the portion of the second user superimposed over the background scene; and
outputting, at the server computing device, the static image to the first user computing device.

2. A computer-implemented method, comprising:
receiving, at a server computing device having one or more processors, a first video stream from a first user computing device associated with a first user, the first video stream including a first image portion that is representative of at least a portion of the first user;
extracting, at the server computing device, the first image portion of the first video stream by utilizing an object detection algorithm to detect a first face in the first video stream in order to generate a first overlay stream;
receiving, at the server computing device, a second video stream from a second user computing device associated with a second user;
generating, at the server computing device, a composite video stream from the first overlay stream and the second video stream from the second user computing device associated with the second user, the composite video stream comprising the first overlay stream superimposed over the second video stream from the second user computing device associated with the second user; and
outputting, at the server computing device, the composite video stream to the second user computing device associated with the second user.

3. The computer-implemented method of claim 2, further comprising:
receiving, at the server computing device, a command from the second user computing device to capture a static image from the composite video stream; and
generating, at the server computing device, the static image in response to receiving the command.

4. The computer-implemented method of claim 3, further comprising outputting, at the server computing device, the static image to at least one of the first and second user computing devices.

5. The computer-implemented method of claim 2, further comprising receiving, at the server computing device, a background video stream representative of a background scene, wherein the composite video stream comprises the first overlay stream and at least a portion of the second video stream superimposed over the background scene.

6. The computer-implemented method of claim 5, further comprising extracting, at the server computing device, the portion of the second video stream from the second video stream by utilizing an object detection algorithm, wherein the portion of the second video stream is representative of at least a portion of the second user.

7. The computer-implemented method of claim 2, wherein the first image portion is representative of at least a portion of the first user.

8. The computer-implemented method of claim 2, wherein the server computing device receives the first video stream and the second video stream concurrently via a video chat application, and wherein the composite video stream is generated such that the first overlay stream and the second video stream in each frame of the composite video stream originate from a same time.

9. The computer-implemented method of claim 2, wherein the server computing device generates the composite video stream automatically upon receipt of the first and second video streams.

10. The computer-implemented method of claim 2, wherein the server computing device receives the first and second video streams via the Internet, and wherein the server computing device outputs the composite video stream via the Internet.

11. The computer-implemented method of claim 2, wherein:
the first video stream comprises a plurality of frames, each frame of the plurality of frames including one or more portions associated with a foreground and one or more portions associated with a background, and
the first image portion includes the one or more portions associated with the foreground.

12. A server computing device, comprising:
one or more processors; and
a non-transitory, computer readable medium storing instructions that, when executed by the one or more processors, cause the computing device to perform operations comprising:
receiving a first video stream from a first user computing device associated with a first user, the first video stream including a first image portion that is representative of at least a portion of the first user;
extracting the first image portion of the first video stream by utilizing an object detection algorithm to detect a first face in the first video stream in order to generate a first overlay stream;
receiving a second video stream from a second user computing device associated with a second user;
generating a composite video stream from the first overlay stream and the second video stream from the second user computing device associated with the second user, the composite video stream comprising the first overlay stream superimposed over the second video stream from the second user computing device associated with the second user; and
outputting the composite video stream to the second user computing device associated with the second user.

13. The server computing device of claim 12, wherein the operations further comprise:
receiving a command from the second user computing device to capture a static image from the composite video stream; and
generating the static image in response to receiving the command.

14. The server computing device of claim 13, wherein the operations further comprise outputting the static image to at least one of the first and second user computing devices.

15. The server computing device of claim 12, wherein the operations further comprise receiving a background video stream representative of a background scene, wherein the composite video stream comprises the first overlay stream and at least a portion of the second video stream superimposed over the background scene.

16. The server computing device of claim 15, wherein the operations further comprise extracting the portion of the second video stream from the second video stream by utilizing an object detection algorithm, wherein the portion of the second video stream is representative of at least a portion of the second user.

17. The server computing device of claim 12, wherein the server computing device receives the first video stream and the second video stream concurrently via a video chat application, and wherein the composite video stream is generated such that the first overlay stream and the second video stream in each frame of the composite video stream originate from a same time.

18. The server computing device of claim 12, wherein the server computing device generates the composite video stream automatically upon receipt of the first and second video streams.

19. The server computing device of claim 12, wherein the server computing device receives the first and second video streams via the Internet, and wherein the server computing device outputs the composite video stream via the Internet.

20. The server computing device of claim 12, wherein:
the first video stream comprises a plurality of frames, each frame of the plurality of frames including one or more portions associated with a foreground and one or more portions associated with a background, and
the first image portion includes the one or more portions associated with the foreground.

* * * * *